(No Model.)

A. McCONNELL.
ATTACHMENT FOR HARVESTERS.

No. 535,715. Patented Mar. 12, 1895.

Witnesses
J. W. Reynolds
L. G. Randall.

Inventor
Anthony McConnell
By John Wedderburn
his Attorney

UNITED STATES PATENT OFFICE.

ANTHONY McCONNELL, OF PALMER, WISCONSIN.

ATTACHMENT FOR HARVESTERS.

SPECIFICATION forming part of Letters Patent No. 535,715, dated March 12, 1895.

Application filed November 2, 1894. Serial No. 527,713. (No model.)

*To all whom it may concern:*

Be it known that I, ANTHONY MCCONNELL, a citizen of the United States, residing at Palmer, in the county of St. Croix and State of Wisconsin, have invented certain new and useful Improvements in Attachments for Harvesters; and I do hereby declare the following to be a full, clear, and exact description of the invention, such as will enable others skilled in the art to which it appertains to make and use the same.

My invention relates to an improved attachment for harvesting machines, the object of the same being to provide a device capable of being attached to harvesters of any construction, for the purpose of clearing the track of the main or bull wheel of said harvesters, thereby preventing the grain from being crushed to the ground by the said bull wheel and thereby lost.

In harvesters of ordinary construction, the main or bull wheel is from eight to ten inches wide and when driven through a field of grain, it crushes and destroys the grain over a tract of land the extent of the ground covered thereby and of a width corresponding to the width of the bull wheel.

When harvesters were first brought into use, it was the custom of most farmers to use a cradle in the field before the harvester was driven thereover. Waste was thereby prevented. Now, however, it is rarely the case that a farmer owns a cradle, and as a consequence, the use of the same is dispensed with and the harvester is driven directly into the field of grain, thereby causing great waste. My invention is devised to prevent this waste by clearing the path of the bull wheel in advance of the passage of the harvester.

The invention consists of a sprocket chain or belt provided with a series of downwardly depending teeth thereon which are adapted to move laterally across the path of the machine in front of the main or bull wheel. The said toothed belt or chain is suitably mounted upon sprocket wheels, one of which is attached to a shaft carrying a beveled gear wheel adapted to mesh with one of the gear wheels on an operative shaft of a harvesting machine of ordinary construction.

The invention is clearly illustrated in the accompanying drawings, in which—

Figure 1:
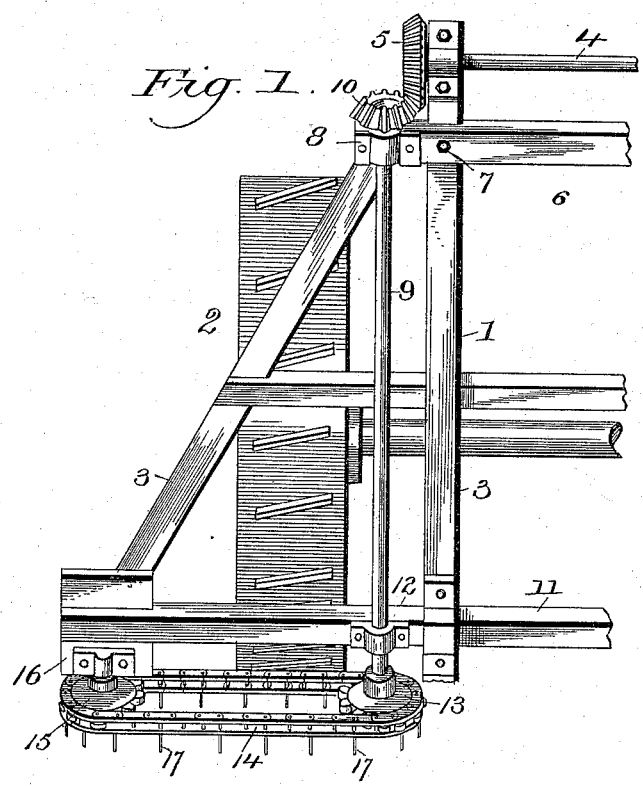
Figure 2:
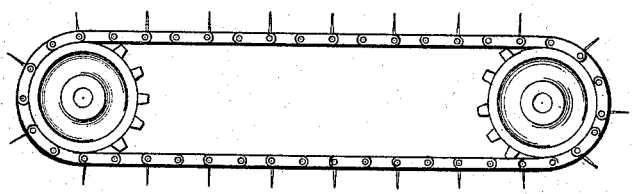

Figure 1 represents a perspective view of my device attached to the front of a harvester of ordinary construction. Fig. 2 is a detached view of a modified form of construction.

Similar reference numerals indicate similar parts in the two views.

1 represents a harvster and 2 the main or bull wheel thereof and 3, 3, vertically disposed beams forming a part of the front frame work of the machine.

4 represents a horizontally disposed shaft forming a part of the harvester, rotated by means of suitable gearing from the main drive shaft. This shaft carries upon its outer end a beveled gear wheel 5.

6 represents a bar attached to the beams 3, 3, in any suitable way, as by bolts 7. In the outer end of said bar is a box 8, in which moves the vertically disposed rod or shaft 9, carrying upon its upper end the beveled gear wheel 10 meshing with the gear wheel 5 before mentioned.

11 represents a bar forming a part of my attachment which is secured to the lower end of the beams 3, 3, in any suitable or convenient manner and on the side of said cross-bar is a bearing 12, through which passes the lower end of the shaft 9. The lower end of the shaft 9 carries a sprocket wheel 13 around which passes the sprocket chain 14, connecting the same with the idle sprocket wheel 15, mounted in suitable boxes on the piece 16, secured to the outer end of the cross-bar 11. The sprocket chain has thereon a series of depending teeth or spikes 17 which extend downwardly to within a short distance of the ground.

It will be seen that by the rotation of the shaft 9 through the beveled gears 10 and 5, the sprocket wheel 13 is caused to rotate, carrying with it the sprocket chain 14. This moving laterally across the frame in front of the main or bull wheel in the harvester will sweep the grain out of contact therewith and form a path over which the bull wheel may pass, without crushing and thereby wasting the grain. Upon the return of the harvester, the grain thus swept away or turned aside, can be collected and all waste prevented.

I have shown in Fig. 2 the sprocket wheel upon which the sprocket chain described is carried as moving in a vertical plane, with the projecting teeth or spikes depending laterally of the width of said chain. I may also use, instead of the sprocket wheel and chain, a pair of drums moving in a vertical plane, carrying an endless belt of leather or other suitable material, having blocks fastened thereto in which the spikes are inserted.

Having now described my invention, what I claim as new, and desire to secure by Letters Patent, is—

1. An attachment for harvesters adapted to sweep the grain out of the path of the main or bull wheel, consisting of a pair of sprocket wheels carrying a sprocket chain having depending teeth or spikes thereon and means for operating said sprocket wheels from the main shaft of the harvester, substantially as and for the purposes described.

2. The combination with a harvester of an attachment therefor adapted to sweep the grain from the path of the main or bull wheel of said harvester, the same consisting of the combination of a pair of cross-bars adapted to be secured to the main frame of the harvester in advance of the main or bull wheel, a rod or shaft having a beveled gear at its upper end meshing with a gear wheel on one of the operating shafts of said harvester and carrying at its lower end a sprocket wheel, a second sprocket wheel mounted in suitable bearings in said cross-beams and a sprocket chain carrying depending spikes or teeth actuated by said sprocket wheels, substantially as and for the purposes specified.

In testimony whereof I have signed this specification in the presence of two subscribing witnesses.

ANTHONY McCONNELL.

Witnesses:
W. McConnell,
H. H. Powell.